Patented May 27, 1952

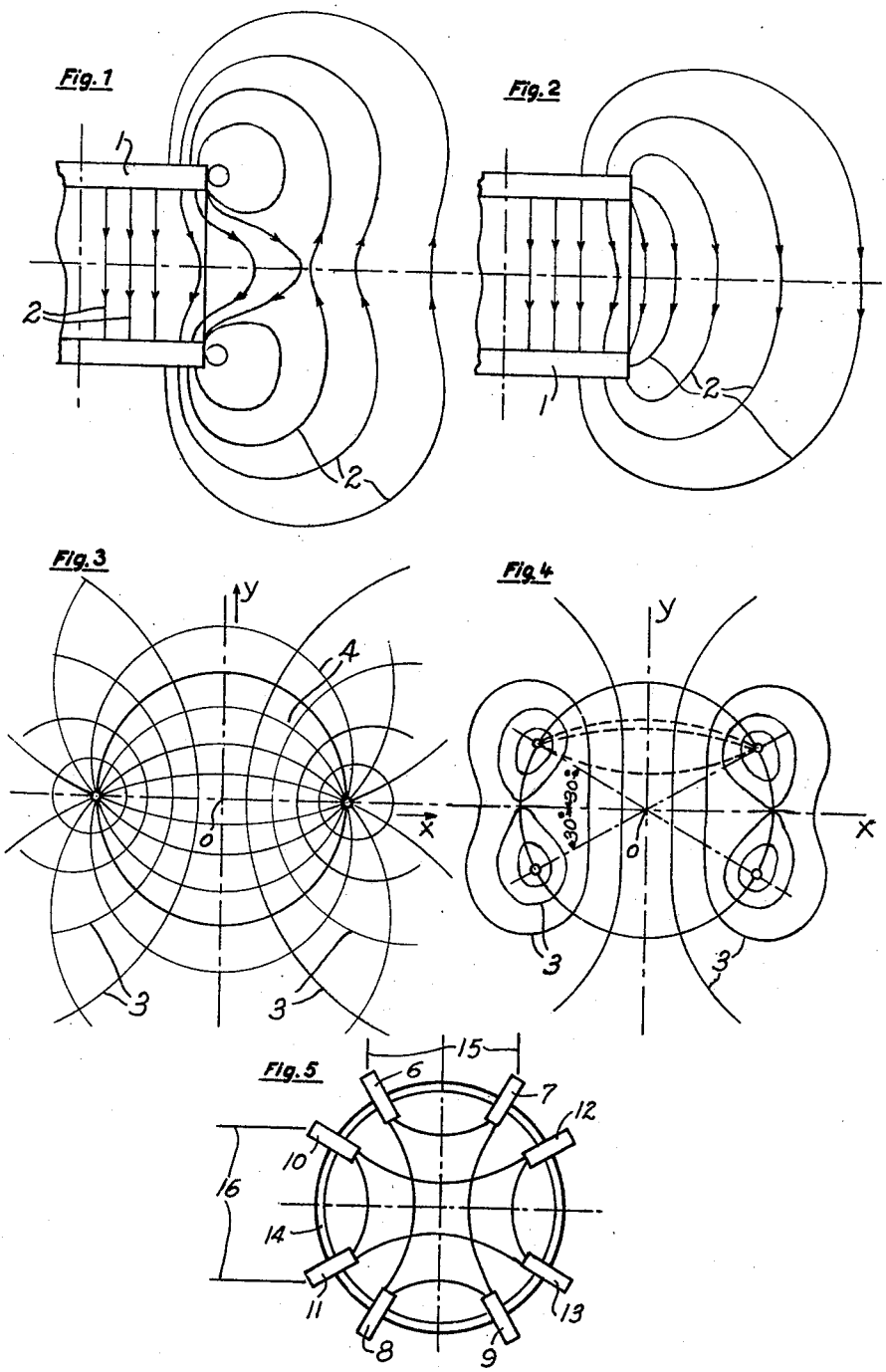

2,598,302

UNITED STATES PATENT OFFICE 2,598,302

DEVICE FOR THE MAGNETIC DEFLECTION OF CATHODE-RAY TUBES

Wolfgang Reinhard, Pforzheim, Germany, assignor to International Standard Electric Corporation, New York, N. Y., a corporation of Delaware Application November 15, 1951, Serial No. 256,454
In Germany November 3, 1949

2 Claims. (Cl. 313—76)

For the magnetic deflection of cathode ray tubes, preferably for television purposes, it is well known to employ a device consisting of a yoke body embracing the beam and of coil windings embracing the cross-section of this body and which is characterized by the fact that the yoke body is designed as a circular cylinder. With this known device the windings for each deflection coordinate are subdivided into four coils, which are arranged symmetrically to the diameter corresponding to the direction of deflection.

The eight coils comprising both deflection windings and those spaced with the coil center on radii of 45° angular spacing about the circumference of the cylinder.

It has been discovered that a more favourable field distribution is created when the coils producing both partial fields, of each deflection field, are inclined to each other at an angle of more than 45° but less than 90°.

A closer description of the idea of the invention shall be given with the assistance of the drawings in which the field course of several known and invented deflection equipments are represented and in which:

Figure 1 is the representation of the deflection magnetic field from one winding in the known arrangement in the plane containing the axis of the cylindrical core and the field deflection direction, Figure 2 represents the equivalent for the equipment according to the invention, Figure 3 represents the magnetic field in the plane of deflection direction of two coils forming a deflection winding arranged on the diameter of an annular core opposed to each other.

Figure 4 represents a magnetic deflection field in the same plane as Fig. 3, however, with two crossed fields according to the invention.

Figure 5 represents the arrangement of the coils on the circular cylinder according to the invention.

The arrangement of the invention differs from the known device in a noteworthy manner regarding the frontal straying as is shown in Figures 1 and 2. In Fig. 1 the cylindrical yoke and symmetrical windings for one field are indicated diagrammatically at 1. The lines of flux of the magnetic field are represented by numeral 2. From this illustration it may be seen that in the known arrangement a saddle point is formed in the field lines on the axis in some distance from the coil. This means that the field lines of the main field are considerably arched and that the stray flux is running in the opposite direction to the main flux in a wider distance from the coil. Both occurrences tend to diminish the deflection sensitivity.

Figs. 3 and 4 show the magnetic field in a plane perpendicular to the axis of the deflecting yoke 3 for the systems of Figs. 1 and 2 respectively. In the center of the plane 0, not subjected to the straying, the field can be treated as it were as linear and the drawing of Fig. 3 will be obtained with two coils confronting each other on the diameter ($x$=direction of deflection, $y$=direction of the field). The magnetic field lines are shown at 3 and the corresponding electric lines of force at 4.

Mathematical considerations show that for small values of $x\,y$ the field increases slowly in the direction of deflection $x$ and will decrease slowly in the direction of the field $y$. This would be desirable. The further examination unfortunately shows, however, that for large deflection in both directions the resultant field is inclined at an angle of 45° or more and the deflection will take just the opposite attitude, that is, the field will decrease the $x$ direction and increase in the $y$ direction. If a deflection field is produced composed of two separate fields as described in Fig. 3, which are rotated from the deflection axis at an angle of 30° above and below this axis, it can be shown that for small $x\,y$ the resultant field will be uniform up to the rates of the fourth order. By using two component deflection fields of this kind, which consequently consist of a total of four single fields of the drawing (Fig. 4), the deflection co-ordinates in all directions are substantially uniform. It is obvious that a rotation-symmetrical arrangement of the fields will be very favorable for the achievement of this effect.

Fig. 5 shows the distribution of the coils for two fields perpendicularly arranged to each other and each of which is composed of two single fields. Coils 6, 7, 8, 9 may constitute the vertical deflection winding and coils 10, 11, 12, 13 the horizontal deflection winding. The coils are interconnected to form the separate vertical and horizontal windings as indicated diagrammatically in lines 15 and 16 respectively all mounted on yoke 14. As may be seen, the coils for producing different directions of deflection are closer together than the ones producing the same direction of deflection. The angle between coils 10 and 11, and between coils 6 and 7, should be between 45° and 90°, preferably approximately 60°.

What is claimed is:

1. In a magnetic deflection system for cathode rays, in particular for television purposes, consisting of a yoke body designed as a circular cylinder surrounding the beam and of coil windings surrounding the cross-section of this body, an arrangement for improving the deflection effects, consisting of four coils in each winding for producing component deflection fields, two of the coils for each winding being interposed between two coils of the other winding, the angular spacing between said two coils of each winding on said yoke being more than 45° and less than 90°.

2. A magnetic deflection system according to claim 1 wherein the spacing between said two coils is approximately 60°.

WOLFGANG REINHARD.

REFERENCES CITED

The following references are of record in the file of this patent:

UNITED STATES PATENTS

| Number | Name | Date |
|---|---|---|
| 2,143,579 | Ruska | Jan. 10, 1939 |
| 2,165,803 | Maloof | July 11, 1939 |
| 2,228,821 | Hansen | Jan. 14, 1941 |
| 2,395,966 | Goldberg | Mar. 5, 1946 |
| 2,406,740 | Buckbee | Sept. 3, 1946 |
| 2,414,925 | Buckbee | Jan. 28, 1947 |
| 2,437,513 | Gethmann | Mar. 9, 1948 |
| 2,443,032 | Gethmann | June 8, 1948 |
| 2,568,456 | Maheiros | Sept. 18, 1951 |
| 2,578,342 | Ekvall | Dec. 11, 1951 |